No. 845,204. PATENTED FEB. 26, 1907.
H. B. SPERRY.
COMBINED SIDE DELIVERY HAY RAKE AND TEDDER.
APPLICATION FILED JAN. 7, 1907.
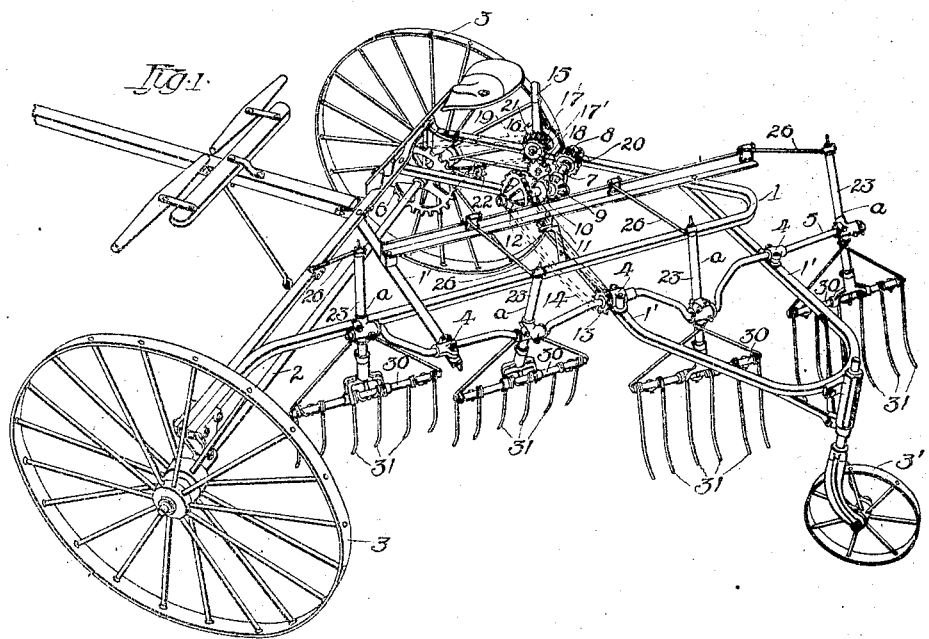
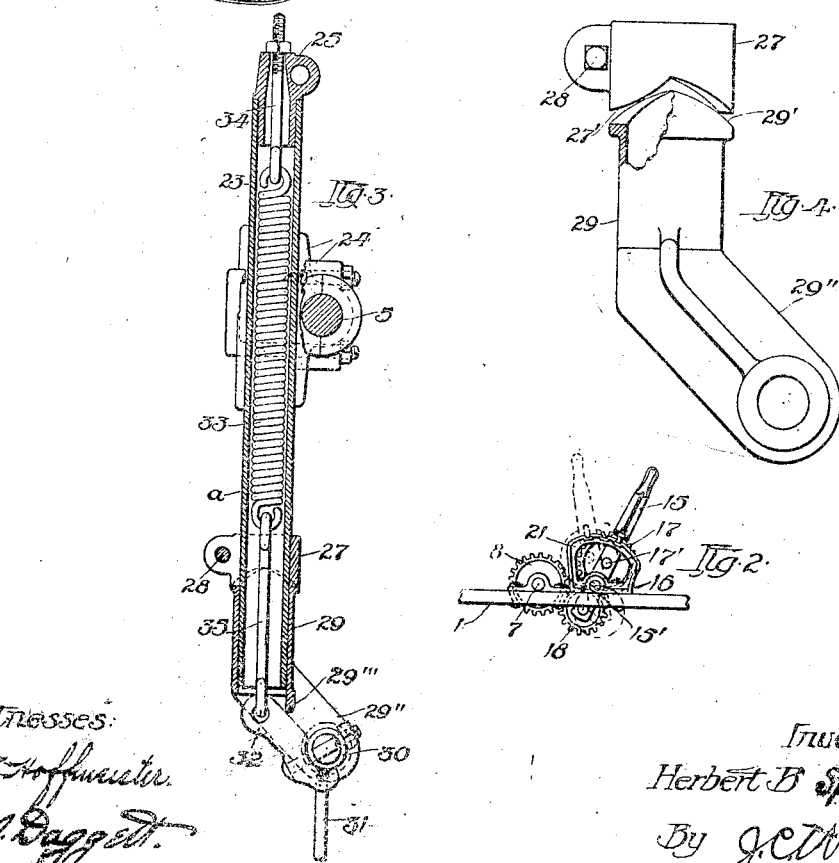
Witnesses:
Inventor
Herbert B Sperry
By J. C. Warne
Attorney

UNITED STATES PATENT OFFICE.

HERBERT B. SPERRY, OF SPRINGFIELD, OHIO, ASSIGNOR TO INTERNATIONAL HARVESTER COMPANY, A CORPORATION OF NEW JERSEY.

COMBINED SIDE-DELIVERY HAY RAKE AND TEDDER.

No. 845,204.   Specification of Letters Patent.   Patented Feb. 26, 1907.

Application filed January 7, 1907. Serial No. 351,134.

*To all whom it may concern:*

Be it known that I, HERBERT B. SPERRY, a citizen of the United States, residing at Springfield, in the county of Clark and State of Ohio, have invented a new and useful Improvement in a Combined Side-Delivery Hay Rake and Tedder, of which the following is a complete specification.

This invention relates to an improvement in side-delivery hay-rakes of the "kicking-fork" type, the object being to produce a machine which can be converted at will into either a side-delivery hay-rake or a tedder, a single implement with certain modifications thus being made to serve a double function, with the consequent cheapening of the process of curing and handling hay.

Referring to the accompanying drawings, Figure 1 represents a perspective view of a side-delivery hay-rake embodying my improvement. Fig. 2 is a detail of the reversible gear-clutch, showing a portion of same in side elevation. Fig. 3 is a longitudinal section of a fork-arm, and Fig. 4 is a detail showing in side elevation the fork-casting on the lower end of the fork-arm.

In the drawings the main frame of the rake is designated by 1, the axle by the numeral 2, and the supporting-wheels on said axle by 3. The rear end of the frame 1 is supported on the caster-wheel 3'. Journaled in the bearings 4 on the cross-bars 1' of the frame 1 is the multiple-crank shaft 5. This crank-shaft is operated by means of a reversible driving connection which is interposed between the supporting-wheels 3 and said shaft and is constructed as follows: The axle 2 rotates with the wheels 3, and fixed thereto is a large sprocket-wheel 6. Journaled in suitable bearings on the rake-frame 1 and extending parallel with the axle 2 is the short cross-shaft 7, on the outer end of which is fixed the spur-pinion 8 and on the inner end thereof the bevel-pinion 9. The last-mentioned bevel-gear meshes with and drives the bevel-pinion 10, fixed to the short shaft 11, which extends parallel with the crank-shaft 5. The shaft 11 journals also in suitable bearings on the main frame and has secured to its other end the sprocket-wheel 12. A small sprocket wheel 13 is fixed to the crank-shaft 5, the chain 14 connecting the two sprocket-wheels. To communicate motion in reverse directions to the pinion 8 on shaft 7, an arm 15 is pivotally mounted at 15' in the bracket 16, which is secured to the main frame. Above the pivotal bearing 15' on the lever 15 is journaled the spur-pinion 17, and meshing therewith and mounted also on said lever below its pivotal bearing is the pinion 18. These two movable pinions 17 and 18 lie in the same plane with the pinion 8, so that when the lever 15 is rocked in a forward direction the pinion 18 will be thrown in mesh with said pinion 8, and when rocked rearwardly the pinion 17 will be made to mesh therewith, thus driving in a reverse direction, while the lower pinion 18 will run idle. Motion is imparted to these pinions 17 and 18 through the sprocket-chain 19, which engages the large sprocket 6 on the axle 2 and a sprocket-wheel 20 on the end of the shaft 17', to which is fixed the pinion 17. A suitable quadrant, as 21, controls the position of the lever 15, and a chain-tightener 22 adjusts the tension of the chain 19 when the position of the lever is changed.

On the crank-shaft 5 is journaled a series of reversible forks, designated as a whole by *a*. These forks are comprised, preferably, of a hollow fork-arm 23, fixed to a two-part bearing 24, which journals on the wrist of the crank-shaft. In the upper end of the hollow arm 23 is fitted a cored plug 25, adapted to engage the bent end of the fork-controlling rod 26. Near the lower end of the arm 23 is clamped, by means of the bolt 28, the sleeve-formed casting 27, the lower end of which is provided with the cam-shaped depression 27'. Immediately below the casting 27 and surrounding the lower end of the fork-arm 23 is the sleeve-formed fork-bracket 29, which is provided at its upper end with a cam projection 29', corresponding with the cam depression 27' in the casting 27. These cam services are bilaterally constructed, so that the casting will fit together in either of two positions, forward or rearward and one hundred and eighty degrees apart. The fork-bracket 29 is provided with the arms 29", which engage the tooth-bar 30. The fork tines or teeth 31 are secured to this bar, as is also the short arm 32, which is arranged in line with the center of the bar 23. A coil-spring 33 is placed within said hollow bar 23, secured above by the eyebolt 34, which projects through the cap 25 and connecting below through the link 35 with the end of the arm 32. The arm 32 rests against the downwardly-projecting lip 29''' of the casting 29, thus limiting the movement of the tooth-bar 30 and teeth 31 thereon, the spring 33 permitting the teeth to yield when necessary in operation.

The gear-clutch in Fig. 1 is shown in an inoperative position, neither the pinions 17 nor 18 meshing with the pinion 8; but when the lever 15 is moved rearwardly until pinions 17 and 8 are in mesh the crank-shaft 5 will be made to move rearwardly in the upper portion of its path, or in the proper direction to rake the hay forwardly and to one side. In this position the forks *a* occupy the positions as shown by the two forks on the left-hand side of the machine in Fig. 1.

To convert the rake into a tedder, the forks *a* are turned one-half round, or to the position indicated by the two forks on the right-hand side of the machine in Fig. 1, the lever 15 being moved forwardly to disengage the pinion 17 from the pinion 8 and to engage pinion 18 therewith. The spring 33 will yield sufficiently to permit the fork-bracket 29 to be pushed by the cam-surfaces along the arm 23 as the fork is being turned half-round. With the forks in such reversed position and the direction of rotation of the crank-shaft 5 reversed the machine will operate as an ordinary tedder, except that the hay will be moved somewhat laterally as well as rearwardly. In such instances this lateral movement might become very desirable, especially when drying the hay in windrows, as is frequently done.

What I claim as my invention, and desire to secure by Letters Patent, is—

1. In a combined side-delivery hay rake and tedder, in combination, a frame, a multiple-crank shaft, reversible forks mounted thereon, and reversible means for imparting movement to said crank-shaft, substantially as and for the purpose specified.

2. In a combined side-delivery hay rake and tedder, in combination, a frame, an axle and supporting-wheels therefor, a multiple-crank shaft mounted on said frame, reversible forks mounted on said crank-shaft, a driving connection interposed between said supporting-wheels and the multiple-crank shaft, said driving connection including a reversible gear-clutch, substantially as and for the purpose specified.

3. In a combined side-delivery hay rake and tedder, in combination, a frame, an axle, supporting-wheels therefor, a multiple-crank shaft mounted on said frame, fork-arms journaled on said crank-shaft, reversible forks mounted at the lower end of said arms, and reversible means for imparting movement to said crank-shaft, substantially as and for the purpose specified.

4. In a combined side-delivery hay rake and tedder, in combination, a frame, an axle, supporting-wheels therefor, a multiple-crank shaft mounted in said frame, reversible forks journaled on said shaft, said forks comprising a hollow fork-arm having a journal-box secured thereto which engages the crank-shaft, a sleeve-formed casting secured to the lower end of the fork-arm and provided with a cam-shaped depression on its lower end, a sleeve-formed fork-bracket engaging the lower end of said fork-arm and provided with corresponding cam projection fork-tines held in said bracket, and a coil-spring located in the fork-arm for holding the bracket yieldingly against said fixed casting, and reversible means for imparting movement to said crank-shaft, substantially as and for the purpose specified.

HERBERT B. SPERRY.

Witnesses:
MILLIE WEY,
WILLIAM H. GUTHRIE.